Patented June 15, 1926.

1,588,960

UNITED STATES PATENT OFFICE.

SAILENDRA N. GUPTA, OF SAN FRANCISCO, CALIFORNIA.

INDIGO DYESTUFF.

No Drawing.          Application filed May 10, 1924. Serial No. 712,457.

This invention relates to a simple method of producing a dye stuff concerning indigo blue.

At the present time the production of the above has been brought about by several well known methods. The dye is usually represented by the empirical formula $C_8H_5NO$, but in reality the formula is more complicated as by an analysis of the vapor density of indigo blue, it has been found that the formula must be double that of the empirical formula just mentioned, and is consequently $(C_8H_5ON)_2$. The empirical formula of the indigo blue has been changed from time to time as new facts have been ascertained, and the present formula is the result of experimentation in which the following facts were gathered:

1. The presence of a benzene ring in the molecule as shown by its easy oxidation into isatin which contains the ring.

2. The ease with which indigo is obtained from indole, indoxyl, and isatin, being the evidence of the presence of the structure as follows:

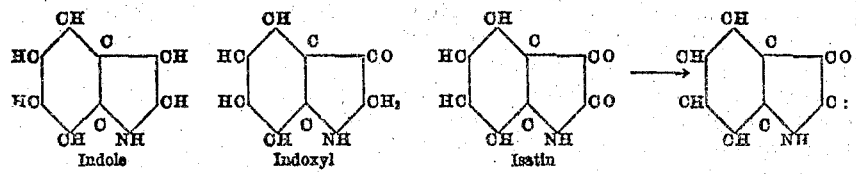

Indole      Indoxyl      Isatin

3. The structural formula of indigo itself is based upon the structure of these and related compounds. The molecular formula for indigo corresponding with the vapor density stated above, consists of two indoxyl rings united by a double linking between two of the carbon atoms and its formation by the oxidation of indoxyl is represented by the following equation:

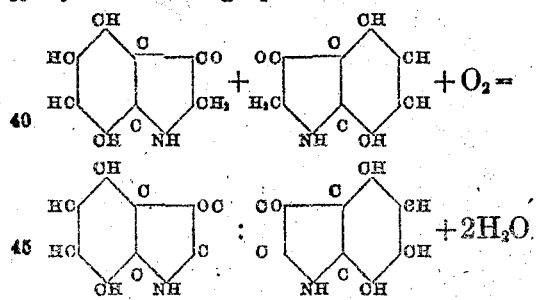

The relation of indoxyl and isatin to indigo was established by Von Bayer and his pupils, forming the basis for the most important synthetical methods for the preparation of the dye, whilst the relation of indoxyl to indigo has a direct bearing on the condition under which the dye is obtained from the indigo plant.

From the summary of all the available derivatives of indigo or analogues of the substances, the following facts are obtained, that the tinctorial properties of indigo are due to the presence of the chromophore group

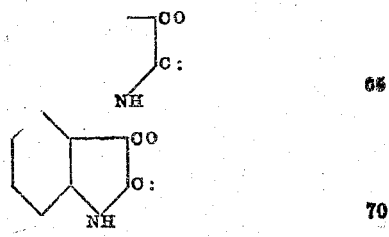

which forms a closed chain with the benzene ring.

But the present invented method employed produces a dye stuff or its analogues indigo blue direct from aniline, not through the line of Heumann's synthesis obtained through phenyl-glycocoll by the condensation of aniline with chloracetic acid, nor by the application of formaldehyde and sodium cyanide to aniline. It brings out another fact than the above—

1. That the tinctorial power of the indigo or its analogues resides not on linking carbon atoms with a closed chain forming the benzene ring as shown above, but on the aniline itself as shown below:

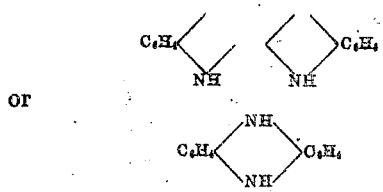

The above is due to the fact that when aniline is oxidized by means of oxidizing agents with the aid of inorganic acid, the chromophore blue is formed, which is shown in some of the formulas, for example:

I. $6C_6H_5NH_2+12HCl+4CrO_3=$
$3(C_6H_4NH)_2+4CrCl_3+12H_2O$

Note: Any other chromic oxides or potassium dichromate can be used for oxidizing the aniline in the above manner.

II. $4C_6H_5NH_2+8HCl+4BaO_2=$
$2(C_6H_4NH)_2+4BaCl_2+8H_2O$

Note: Other peroxides can be used for oxidizing the aniline in the same manner.

III. The aniline can be oxidized in the same way if sodium peroxide, potassium chlorate, calcium hypochlorite or bleaching powder is used, only in the case of the latter, a little calcium peroxide is needed to aid the reaction to completion.

That is, when aniline is oxidized by means of oxides, peroxides or trioxides, etc., with the aid of inorganic acid, the blue chromophore is formed as a fundamental part of indigo, but I have stated already that indigo contains a bonded chain of CO—C:C—OC groups linked with a benzene ring which gives the following formula corresponding to the vapor density.

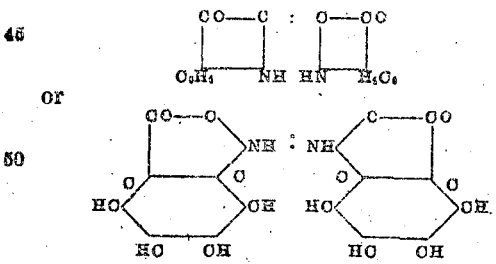

That is, when a substitution product is attached to the chromophore blue, complete indigo synthesis is obtained; and splitting the indigo with potassium hydroxide, two products are noticed. One is aniline, which is already known to the chemists of indigo, but the other was not very closely observed when aniline was distilled over.

The process and the product on the other hand were not thoroughly investigated before. The product appears to me after careful analysis to resemble potassium acetate in properties. In attaching acetic acid as a substitution of the

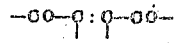

group with the chromophore blue, a blue dye is obtained with a vapor density like indigo blue.

In my opinion, the tinctorial power of indigo lies within the imino-benzene ring. As there is only C—OC:C—OC molecules needed besides the imino-benzene ring to complete the indigo formula, this is attained by the addition of organic acids.

To prove this, experiment has been made with chromophore blue and other organic acids, such as acetic-citric, gallo-formic (gallic and formic), lacto-formic (lactic and formic), oxalic, tannic, tartaric, etc., and the blue indigoid is obtained according as the required substitution CO—C:C—OC chain would be required from the above organic acids or their combinations.

The above formulas will act in the same way if aniline hydrochloride is used instead of aniline, only additional hydrochloric acid must be added to form the compounds, such as in the case of $CrCl_3=2HCl$ extra, $BaCl_2=1HCl$, etc.

Each organic acid will form indigo blue in the above mentioned processes in which chromophore blue is formed, some of them being shown here below:

1.—Aniline, hydrochloric acid, acetic acid, and chromic trioxide— —indigo is precipitated by alkali metal hydroxide.

2.—The above formula with $BaO_2$ and $Na_2O_2$ instead of chromic trioxide.

3.—The above formula with $KClO_3$ instead of the above oxidizing agents.

4.—The above formula with $SnO_2$ instead of the above oxidizing agents.

5.—The above formula with $Cr_2O_3$ instead of the above oxidizing agents.

6.—The above formula with calcium hypochlorite or bleaching powder instead of the above oxidizing agents.

The above will react in the same way if citric, gallo-formic, lacto-formic, oxalic, tannic, tartaric, etc., organic acids, are used to substitute the

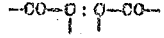

group. Or in other words, indigo blue is formed if aniline is oxidized and organic acids used to substitute

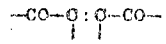

in the above-mentioned methods.

Having thus described my invention, what I claim and desire to secure by Letters Patent is:

1. A step in the production of indigo from aniline comprising oxidizing aniline in acid solution to produce chromophore blue having the formula

2. The method of making indigo comprising treating chromophore blue having the formula

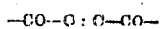

with an organic acid whereby a

—CO—O : O—CO— radical is attached to the imino benzene rings of the chromophore blue.

3. The method of making indigo comprising oxidizing aniline in acid solution to produce chromophore blue having the formula

and attaching a

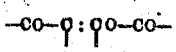

radical to the imino benzene rings of the chromophore blue by treating the chromophore blue with an organic acid.

SAILENDRA N. GUPTA.